United States Patent Office 3,248,332
Patented Apr. 26, 1966

3,248,332

REMOVAL OF IMAGES FROM LITHOGRAPHIC PLATES

Gerald F. O'Connor, Ossining, N.Y., assignor to Polychrome Corporation, Yonkers, N.Y., a corporation of New York No Drawing. Filed Mar. 26, 1963, Ser. No. 267,903
7 Claims. (Cl. 252—143)

This invention relates to a method of removing an image from a metal-base lithographic plate and to a novel composition useful in the removal process. This invention further relates to the transformation of an oleophilic image surface into a hydrophilic surface.

The art of planographic printing depends upon the immiscibility of grease and water and upon the preferential retention of a greasy image-forming substance by the image areas, and a similar retention of an aqueous dampening fluid by the non-image areas. When a greasy image is imprinted upon a suitable surface, and the entire surface is then moistened with an aqueous solution, the image areas will repel the water, and the non-image areas will retain the water. Upon subsequent application of greasy ink, the image portions retain the ink, whereas the moist, non-image areas will repel it. The image is then transferred to paper, cloth, and so on, via an intermediary, so called off-set or blanket cylinder, which is necessary to prevent a mirror-image printing.

Lithograph plates typically are sheet structures on which a photo-sensitive coating, usually a diazo compound, is exposed to light through a negative transparency causing the light-sensitized material to harden, thereby becoming insoluble in a de-sensitizing solution which is applied to the plate after the light exposure for the purpose of removing that part of the light-sensitive coating which, because it was protected from the light by the negative, was not light-hardened. The light-hardened surface of, for example, a negative plate will be the oleophilic surface which is compatible with the greasy ink and is called the "image area"; the surface from which the non-hardened light-sensitive material has been removed with desensitizer will be the hydrophilic surface.

Of course, it will be understood by those skilled in the art that the image remover herein disclosed is equally applicable to the removal of chemically hardened image areas as will be found on positive plates. However, for convenience the language of this disclosure will be phrased as referring to negative plates as described in the preceding paragraph. Furthermore, it is immaterial in the practice of the present invention whether the lithographic plate to be treated is a presensitized plate or one on which the light sensitive coating, i.e., diazo is coated at the time of use or shortly before use.

There are certain problems which arise in using lithographic plates. It is usually economically desirable to obtain a plate which will have the longest possible press life. Clearly, when a long press run is being made which includes the printing of a plurality of very similar prints which differ from one another in only a minor item, for example, by a dateline, etc., it would be advantageous to be able to remove the item from the original plate and replace it with a new item. Misspellings, punctuation errors, and the necessity of maintaining security measures are exemplary of other circumstances making the removal of at least part of an image from a lithographic plate desirable.

Previous methods of removing images, spots, specks, transparency margins, or any other unwanted print from lithographic plates have included removal of the oleophilic layer by mechanical means and removal by treatment with solutions of hydrofluoric acid. The former method consumed excessive time and was not always successful because the mechanically erased area would not always be sufficiently oleophobic to repel ink from its surface. The latter method required the separate packaging of the acid and solvent components, it caused annoying fuming, and was of such a low viscosity that great care, and even skill was required in its successful use in many image removal problems.

An object of the present invention is to provide a composition useful in removing an image from lithographic plates. Another object of this invention is to provide a composition, useful for image removal, which may be packaged conveniently in a single container. Another object of this invention is to provide an economical method for image removal, which may be applied by one without special skill. Another object of this invention is to provide a composition useful for image removal which may be handled easily and safely. Another object of the present invention is to provide a method for the image removal from the lithographic plates which will leave the surface of the plate water receptive, thus prohibiting the reappearance of the image. Other objects of the invention are in part obvious and in part pointed out hereinafter.

These objects have been satisfied by the present invention wherein a metallic hexavalent fluoride compound, a solvent and thickening agent are so compounded that the resulting composition may be used, by even an unskilled person, to quickly and efficiently remove images from lithographic plates. Furthermore, the treated area becomes a hydrophilic and grease-repelling surface. These results are accomplished without the danger of damaging the metal base of the lithographic plate.

In the method of the present invention, there have been combined materials which will dissolve the ink forming the image, the lacquer which is often used to form a protective over-coating upon the image, and the oleophilic light-hardened diazo which forms the ink-attractive portion of the lithographic plate. Furthermore, in a preferred embodiment of the invention, a viscosity-modifier is added to the image removing solvents. This maintains the viscosity of the image-removing composition at such a level that it will not readily spread to, or spill on, areas where it is desired to retain the image, but may still be conveniently spread over the area from which it is desirable to remove the image.

The primary solvent of the composition is chosen from among active solvents known to the art. Acetates, ketones, glycol ethers, and cyclohexanol are typical of the compounds which are useful for the present invention because of the solvating effect which they have upon the ink and the protective lacquer coating. Of course, it will be readily understood that the exact nature of the ink and lacquer, which vary considerably in lithographic printing, will often determine the preferred solvent or combination of solvents most satisfactory for a specific application. However, among the more suitable solvents are butyl acetate, methyl ethyl ketone, and cyclohexanol. Butyl acetate is, in many instances, the preferred solvent.

A material suitably used to eradicate the light-hardened compound, normally a diazo compound, is hydrogen zirconium fluoride or hydrofluozirconic acid. Other materials, similar in nature, may be used such as the hexavalent fluoride salts of the transition elements of Group 4*b*, hafnium and titanium. However, the preferred material is usually, as stated above, hydrogen zirconium fluoride or hydrofluozirconic acid.

This material may be obtained by the reaction of zirconium tetrafluoride with hydrofluoric acid.

$$ZrF_4+2HF \rightarrow H_2ZrF_6$$

The reaction of a salt of the acid with water in an acid medium is another method of producing the compound. For example:

$$K_2ZrF_6 + H_2O \xrightarrow{\text{strong acid}} H_2ZrF_6$$

Phosphoric acid is particularly useful in this latter reaction.

However, hydrofluozirconic acid is commercially available in aqueous solution which is usually most convenient in preparing the composition of the instant invention.

The thickening agent, or viscosity modifier is chosen from among the commercially available thickeners known to the art. Its use in the process is to provide the physical effect of increasing viscosity. Therefore, it is, in this sense, used manipulatively. A suitable thickener is ethyl hydroxy ethyl cellulose. Also suitable are polyols such as polyoxyethylene-polyoxypropylene copolymers. Especially useful are polyoxyethylene-terminated materials comprising about equal portions of polyoxyethylene and polyoxypropylene and having a molecular weight of about 4500. Suitable materials are commercially available and are sold under the trade name Pluronic by the Wyandotte Chemicals Corporation.

In the method of the present invention, the composition comprising the primary solvent and the halide-containing compound is wiped onto the image area to be removed. After a short reaction time, i.e., from one second to one minute depending upon the strength of the particular mixture and the condition of the plate surface, the surface is wiped clean and the diazo compound thereby removed. The primary solvent is suitably present in from about 97.0% to 99.7% of the total weight of active ingredients. Conversely, the fluorine-containing compound is from about 0.3% to 3.0% of the total weight of active ingredients. By active ingredients is meant those which have a chemical action, such as a solvent action, on the lithographic plate surface, i.e., organic solvent and fluoride compound.

In order to point out more fully the nature of the present invention, the following specific examples are given as illustrative embodiments of the present method and composition useful therein.

*Example 1*

The following composition was prepared, the ingredients having been added in the order listed.

| | Grams |
|---|---|
| Butyl acetate | 64.3 |
| Hydrofluozirconic acid solution (11% of acid in water) | 7.1 |
| Ethyl hydroxy ethyl cellulose | 28.6 |

This composition was packed in a plastic container.

An aluminum offset plate 10 inches by 15 inches and .005 inch thick was coated, consecutively and in the ordinary manner known to the art, with an alkali silicate coating and a light-sensitive diazo compound. This plate was exposed to light through a negative and thereafter given a protective coating of lacquer. A short press run was made with the plate.

A portion of the above-described composition was then wiped over the plate and, after a contact time of about 5 seconds, removed. The image areas consisting of light-hardened diazo were completely removed from the plate. This was confirmed by rubbing an oil-base ink compound over the surface of the plate. There was no tendency for the ink to remain on the areas which had been oleophilic before the treatment with the above-identified composition.

*Example 2*

The following composition was prepared, the ingredients having been added in the order listed:

| | Grams |
|---|---|
| Butyl acetate | 90 |
| Hydrofluozirconic acid solution | 10 |

This composition was packaged in a plastic container.

An aluminum offset plate 10 inches by 15 inches and .005 inch thick was coated, consecutively and in the ordinary manner known to the art, with an alkali silicate coating and a light-sensitive diazo compound. This plate was exposed to light through a negative and given a protective coating of lacquer. A short press run was made with the plate.

A portion of the above-described composition was then wiped over the plate and, after a contact time of about 5 seconds, removed. The image areas were completely removed from the plate. This was confirmed by rubbing an oil-based ink compound over the surface of the plate. There was no tendency for the ink to remain on the areas which had been oleophilic before the treatment with the above-identified composition.

*Example 3*

The following composition was prepared, the ingredients having been added in the order listed:

| | Grams |
|---|---|
| Cyclohexanone | 90 |
| Polyoxyethylene-polyoxypropylene copolymer, molecular weight of 4500 | 50 |
| Hydrofluozirconic acid solution (11% of acid in water) | 12 |

This composition was packed in a plastic container.

An aluminum offset plate 10 inches by 15 inches and .005 inch thick was coated, consecutively and in the ordinary manner known to the art, with an alkali silicate coating and a light-sensitive diazo compound. This plate was exposed to light through a negative and thereafter given a protective coating of lacquer. A short press run was made with the plate.

A portion of the above-described composition was then wiped over the plate and, after a contact time of about 5 seconds, removed. The image areas consisting of light-hardened diazo were completely removed from the plate. This was confirmed by rubbing an oil-base ink compound over the surface of the plate. There was no tendency for the ink to remain on the areas which had been oleophilic before the treatment with the above-identified composition.

Even when the image removing composition was allowed to remain on the plate for 30 minutes and dry thereon, the treated image area remained in the desired hydrophilic state.

It is, of course, to be understood that the foregoing examples are intended to be illustrative, and that various changes can be made in the ingredients, proportions and conditions set forth therein without departing from the spirit of the invention as defined in the appended claims.

What is claimed is:

1. A method of transforming an oleophilic image area on the surface of a lithographic plate into a hydrophilic non-image area which comprises applying to said image area to soften it a composition consisting essentially of from about 97.0% to 99.7% by weight of an organic solvent selected from the group consisting of butyl acetate, methyl ethyl ketone and cyclohexanol having dissolved therein from about 0.3% to 3% by weight of a compound of the formula $H_2XF_6$ wherein X is a member selected from the group consisting of titanium, zirconium and hafnium, and wiping the softened image area and residual materials from said plate.

2. A method as defined in claim 1 wherein X is zirconium.

3. A composition for removing an image area from the surface of a lithographic plate consisting essentially of from about 97.0% to 99.7% by weight of a member selected from the group consisting of butyl acetate, methyl ethyl ketone and cyclohexanol as a solvent and from about 0.3% to 3% by weight of a compound of the formula $H_2XF_6$ wherein X is a member selected from the group consisting of titanium, zirconium and hafnium in said solvent.

4. A composition as defined in claim 3 wherein X is zirconium.

5. A composition as defined in claim 3 wherein said solvent is butyl acetate.

6. A composition as defined in claim 3 wherein said solvent is methyl ethyl ketone.

7. A composition as defined in claim 3 wherein said solvent is cyclohexanol.

References Cited by the Examiner

UNITED STATES PATENTS

| | | | |
|---|---|---|---|
| 2,558,013 | 6/1951 | Staubly et al. | 252—143 XR |
| 2,719,079 | 9/1955 | Murphy | 252—79.3 XR |
| 2,737,498 | 3/1956 | Frasch | 252—143 XR |
| 2,780,168 | 2/1957 | Nichols | 252—143 XR |
| 2,942,956 | 6/1960 | Kelley | 252—79.3 XR |
| 2,946,683 | 7/1960 | Mellan et al. | 96—75 |

OTHER REFERENCES

"Pluronics" (Wyandotte Chem. Corp.) (1958) for Home and Laundry Use, page 4.

Prideaux, Journal of Chem. Soc. (1926), page 903.

JULIUS GREENWALD, *Primary Examiner.*

ALBERT T. MEYERS, *Examiner.*

W. F. SCHULZ, *Assistant Examiner.*